United States Patent Office 2,771,149
Patented Nov. 20, 1956

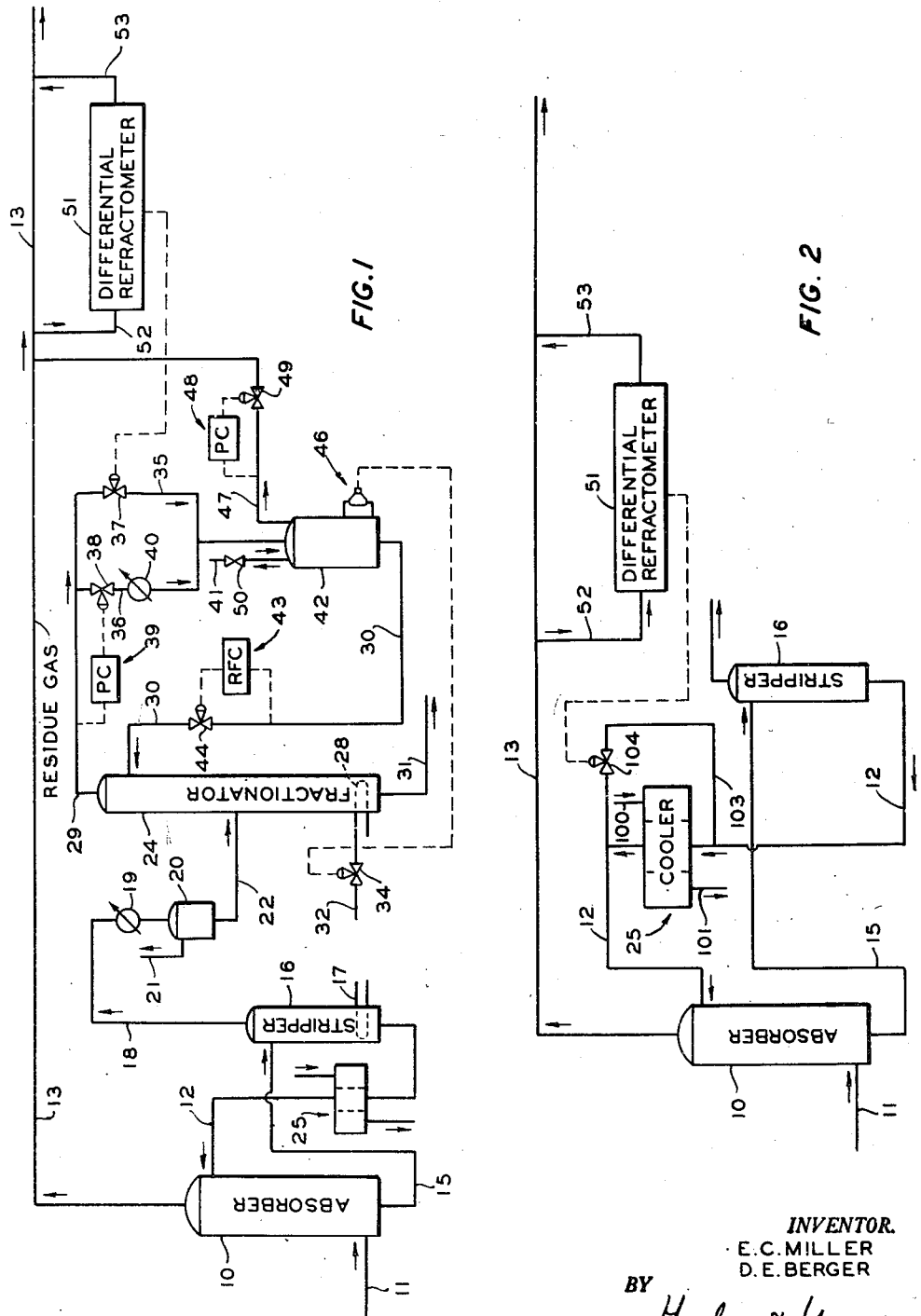

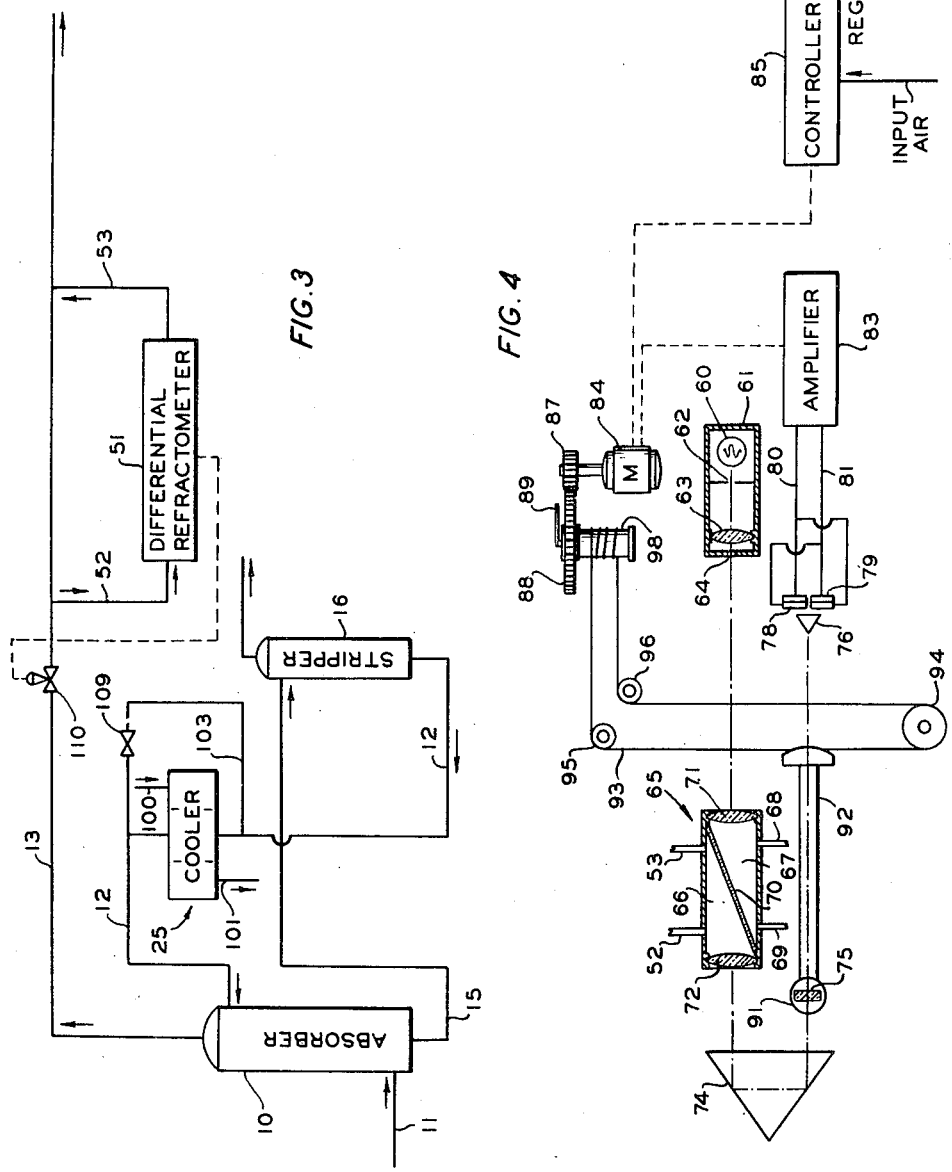

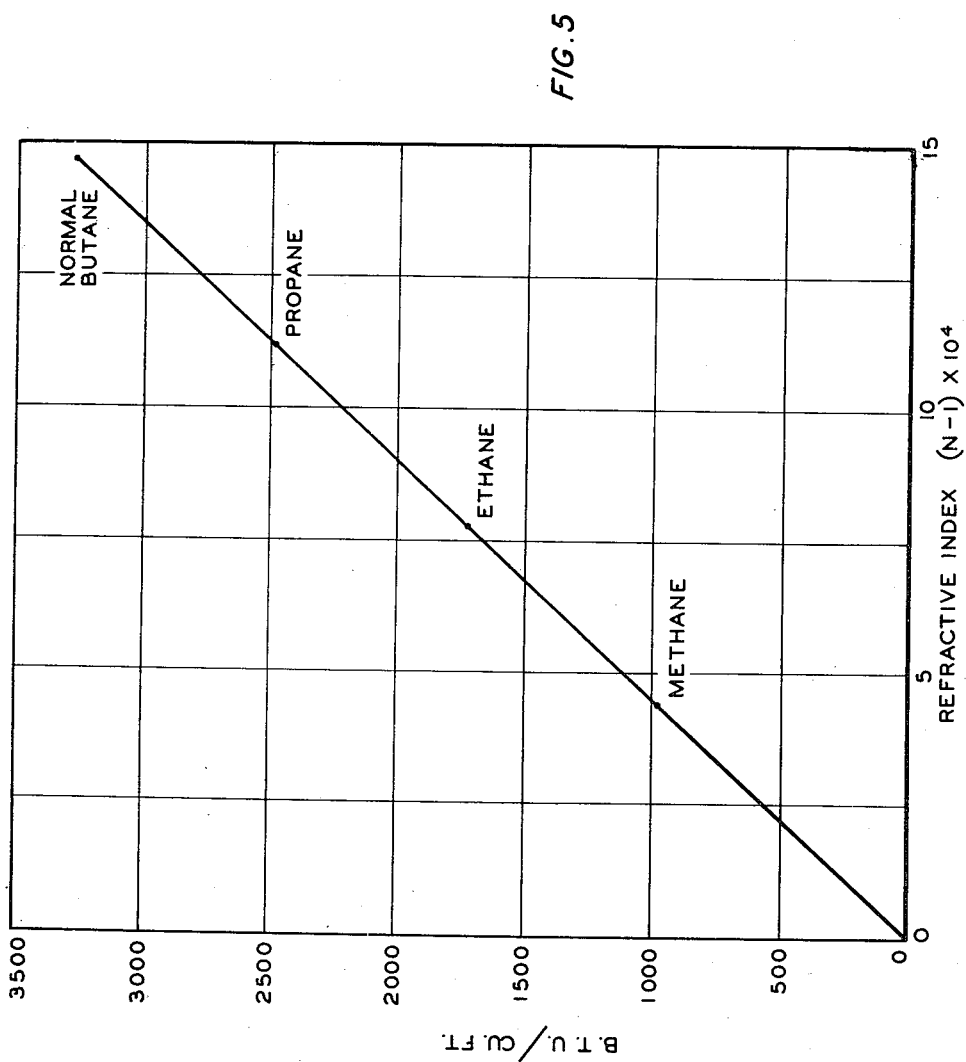

2,771,149

CONTROLLING HEAT VALUE OF A FUEL GAS IN A GAS SEPARATION SYSTEM

Elmer C. Miller and Donald E. Berger, Bartlesville, Okla., assignors to Phillips Petroleum Company, a corporation of Delaware Application October 13, 1952, Serial No. 314,464

12 Claims. (Cl. 183—2)

This invention relates to a method of and apparatus for maintaining a predetermined heating value of a combustible gaseous mixture. In another aspect it relates to a method of measuring the heating value of selected fluid mixtures.

In the operation of a natural gas processing system for the extraction of natural gasoline and liquefied petroleum gas fractions, it has been common practice to make provision to recover the gaseous residue as a third fraction for use as a heating medium. It is well understood that in the operation of such a system the residue gas is subject to wide variations in the heating value thereof, requiring in those cases where the residue gas is to be used as a heating medium a continuously operating system for maintaining the heating value of the residue gas substantially constant. It is generally found that the deviation in the heating value of such residue gas is such as to require an increase in its heating value, which is usually accomplished by blending with the residue gas a gaseous stream of higher heating value. This process is commonly called gas enrichment. A second method of maintaining the heating value of the residue gas substantially constant is to control some process variable in the separating system whereby enough of the heavier hydrocarbon components of the natural gas stream are retained in the residue gas stream to maintain the desired heating value.

The present invention is concerned primarily with providing an improved method of maintaining the heating value of such a residue gas stream substantially constant. The control system in accordance with this invention is based upon a discovery that the ratio of the refractive index minus one ($N-1$) to gross heating value of normally gaseous members of hydrocarbon homologues is constant. Thus, a measurement of the refractive index of such a gaseous mixture, or of such a gaseous mixture which may include substantially constant amounts of other components, provides a simple determination of the total heat content of the mixture being measured. The refractive index of a gaseous stream can be measured continuously and with extreme accuracy by a differential refractometer, and the output signal therefrom can be applied through conventional electrical or pneumatic control mechanism to effect adjustment of a suitable process variable to maintain the heating value of the residue gas stream substantially constant at a preselected value.

Accordingly, it is an object of this invention to provide improved means for maintaining a predetermined heating value of a combustible gaseous mixture through a measurement of the refractive index of said mixture.

Another object is to provide means for regulating and controlling the extraction of natural gasoline from a natural gas stream.

A further object is to provide control mechanism for carrying out the above mentioned objects which is of simplified rugged structure and which is capable of providing accurate results.

Other objects, advantages and features of this invention should become apparent from the following detailed description taken in conjunction with the accompanying drawing in which:

Figure 1 is a schematic flow diagram of a gasoline extraction-gas enrichment system embodying the control system of the present invention;

Figure 2 is a schematic representation of a second form of control system adapted to regulate the heating value of the residue gas stream obtained from an absorber;

Figure 3 is a modified form of the control system shown in Figure 2;

Figure 4 is a schematic representation of a differential refractometer which can be employed in the control system of Figures 1, 2 and 3; and Figure 5 is a graph illustrating a feature of this invention.

A typical natural gasoline extraction plant is illustrated in Figure 1, from which is obtained in addition to the desired gasoline product a residue gas stream. Raw natural gas is introduced into an absorber 10 through a feed line 11. This gas moves upwardly through the absorber countercurrently to the down flow of a lean absorption medium admitted through a line 12. As is well known, a suitable absorption medium for this purpose is mineral seal oil. Thus, natural gas and an absorption medium are brought into contact and the desired natural gasoline constituents and liquefied petroleum gas fraction are absorbed from the mixture leaving a residue gas which passes off the top of the absorber through a line 13. The enriched absorption medium containing the desired absorbed hydrocarbon constituents is withdrawn from the absorber through a line 15 and is passed into a stripper column 16, where by the application of heat through a steam line 17 the absorption medium is stripped of its absorbed hydrocarbon constituents. Hydrocarbons removed from the absorption medium leave the stripper through an overhead line 18 and pass through a condenser 19 into an accumulator tank 20. Uncondensed gases leave accumulator 20 through a line 21 and pass to a vapor recovery plant or to such other disposal as desired not shown. The raw natural gasoline passes from accumulator tank 20 through a line 22, from which it is introduced into about the mid-section of a fractionator column 24. The absorption oil freed from the absorbed constituents leave the bottom of stripper 16 and passes through a cooler 25 in line 12, from which it is introduced back into the top of absorption column 10 to acquire another charge of hydrocarbons from the natural gas.

The purpose of fractionator column 24 is to remove ethane and lighter constituents from the natural gasoline feedstock introduced into the column through charge line 22. Column 24 is equipped with a bottom heating coil 28, an overhead line 29 for removing overhead vapors, a reflux line 30 for the introduction of the liquid reflux and a bottom draw-off line 31. A line 32 conducts steam from a source, not shown, to heating coil 28 at a rate regulated by a motor valve 34 disposed in said line 32. Overhead vapor line 29 is manifolded into two vapor lines 35 and 36. Line 35, which is hereinafter termed a by-pass line, is equipped with a motor valve 37. Line 36 is equipped with a motor valve 38 which forms a part of a back-pressure controller assembly 39. Line 36 also carries a condenser 40 which is provided to cool and condense at least a portion of material passing through line 36 prior to its entry into an accumulator vessel 42. By-pass line 35 joins line 36 on the downstream side of condenser 40 thereby entering accumulator 42. A line 30 is connected to the bottom of accumulator 42 for passage of liquid reflux back into column 24. The rate of flow of reflux through line 30 is regulated by a rate-of-flow controller assembly 43 which adjusts a motor valve 44 disposed in line 30.

Accumulator 42 is equipped with a liquid level controller assembly 46 which is operatively connected with motor valve 34 in the steam line 32. Accumulator 42 is further attached to an overhead gas removal line 47 which is provided to conduct gases from the top of the accumulator into the residue gas line 13 as needed. Gas line 47 is equipped with a back-pressure controller assembly 48 which regulates a valve 49 disposed in line 47.

The absorber-stripper units of Figure 1 are intended to operate in the normal and conventional manner. The absorption oil flowing down through the absorber is adapted to extract all or substantially all of the condensible hydrocarbons defined as pentane and heavier hydrocarbons contained in the natural gas feed entering absorber 10 through line 11, and is further intended to absorb as nearly all of the normally gaseous hydrocarbon such as butanes and propane as is possible. In absorbing gasoline constituents from natural gas small amounts of ethane and methane usually are absorbed therewith. The enriched absorption oil leaves the absorber through line 15 and passes into the stripper vessel 16 in which the absorbed hydrocarbons are removed by a normal stripping operation. The stripped gases pass through the overhead vapor line to condenser 19 wherein as many as possible of these vapors are condensed. The condensate passes on through line 22 into the de-ethanizer column 24, which column is operated under such conditions of temperature and pressure that the bottoms product ultimately withdrawn through line 31 is free from ethane but contains nearly all of the propane. The overhead vaporous material from column 24 passes through overhead line 29, a portion thereof passes through line 36 and the remainder through by-pass line 35. Back-pressure controller 39 is responsive to the pressure in overhead line 29 to maintain a nearly constant pressure on column 24, and in so doing controls the flow of the overhead vapors into line 36 and condenser 40 by the throttling action of motor valve 38 in response to the pressure of the vapors in line 29. The hydrocarbons comprising the vapor stream are condensed, or partially condensed, by condenser 40 in accordance with their respective vapor pressures. Because propane has the lowest vapor pressure the condensate is rich in propane.

A controlled portion of the overhead vapors in line 29 by-pass motor valve 38 and condenser 40 to pass through line 35 containing motor valve 37. The vapors passing through line 35 obviously are not condensed and these vapors substantially as such are conducted into accumulator 42. Because line 35 is connected to line 36 on the downstream side of condenser 40 some of the propane contained in the vapors from line 35 is condensed by the cool condensate originating in condenser 40. This condensed propane, together with a small amount of ethane from line 53, is condensed or dissolved by the time the material from line 35 enters accumulator 42. Not all of the propane is retained by this cool condensate, however, the propane and lighter constituents remaining uncondensed accumulate in the upper portion of accumulator 42 as gas. The back-pressure controller assembly 48 is adapted to operate in such manner as to permit the flow of gases from the upper portion of accumulator 42 through line 47 into the residue gas line 13 in response to the accumulator pressure. Motor valve 49 which is actuated by back-pressure controller assembly 48 is a throttling type motor valve adapted to be open to some extent as long as pressure on the accumulator is sufficiently high. This accumulator pressure is usually sufficiently high to maintain valve 49 open to some extent because the methane and ethane from the de-ethanizer column 24. At times it may be necessary to withdraw 48 is adjusted to maintain a constant pressure on accumulator 42 irrespective of the amount of gas passed from the accumulator to residue gas line 13. Thus, controller 48 actually maintains the desired pressure on de-ethanizer column 24. At times it may be necsesary to withdraw an additional vapor stream from accumulator 42 to meet the ethane content specification in stream 31 from fractionator 24. To this end a vapor line 41 containing a valve 50 is connected to the top of accumulator 42.

The volume of propane rich condensate from accumulator 42 which passes through reflux line 30 is controlled by rate-of-flow controller 43. Controller 43 is set to maintain a predetermined rate of flow of reflux into column 24. If the condensate in accumulator 42 increases in volume faster than is necessary for refluxing purposes the liquid level controller 46 operates to throttle motor valve 34 in steam line 32 such as to decrease the heat supplied to column 24, with the result that less propane is driven overhead from said column. This in turn results in a lowering of the propane rich condensate level in accumulator 42. In like manner when the level of condensate in accumulator 42 reaches a predetermined low value the float controller assembly 46 operates to open motor valve 34 to permit the passage of more steam into heating coil 28. This latter operation causes more propane to pass from column 24 into accumulator 42. Condenser 40 is adapted to condense as much of the propane as possible, in so doing all of this condensed propane ultimately finds its way back into column 24 where it is finally withdrawn in the bottoms product through line 31. Any propane which is not condensed in condenser 40 enters accumulator 42 and ultimately finds its way through line 47 into the residue gas line 13. In order to control the amount of propane added to the residue gas it is necessary to permit the entrance of some uncondensed propane to the accumulator, and such is the function of line 35 with its throttling motor valve 37.

In accordance with the present invention the differential refractometer indicated generally by the reference numeral 51 is connected such that a continuous sample of the residue gas in line 13 is circulated through refractometer 51 by means of lines 52 and 53. Differential refractometer 51 is adapted to continuously measure the refractive index of the gas passing through line 13, and in so doing provides an output signal which is representative of the heat content of said gas. This refractometer is adjusted such that when the heat value of the residue gas in line 13 falls below a predetermined value the output signal from refractometer 51 operates to open motor valve 37 to permit the entrance of additional uncondensed fractionator overhead vapor from line 29 through line 35 into accumulator 42. These vapors in turn flow through line 47 into residue gas line 13. When a sufficient quantity of vapors containing a variable amount of propane as regulated by the operation of the process of this invention are added to the residue gas, differential refractometer 51 functions to throttle valve 37 to close partially or entirely said valve 37 to the flow of propane containing gas. In this manner the residue gas is continuously and uniformly enriched with sufficient gaseous propane to render the desired heating value.

The use of differential refractometer 51 as a control instrument to maintain constant heating value in the residue gas is based upon the discovery that the ratio of refractive index minus one $(N-1)$ to heat value of the normally gaseous paraffin hydrocarbons bears a linear relationship. This is illustrated in Figure 5 wherein heating value in terms of B. t. u. per cu. ft., is plotted against refractive index minus one for the normally gaseous paraffins. In order to more clearly illustrate the linearity of the resulting curve the refractive index is plotted in terms of the quantity $(N-1) \times 10^4$ where N represents the refractive index of the various gases. From this curve it should be apparent that a measurement of the refractive index of a mixture containing any proportion of these four hydrocarbons is in turn a measure of the composite heating value of the gaseous mixture. A similar relationship also holds for other gaseous hydrocarbon homologs. A typical analysis of residue gas obtained from a natural gasoline extraction unit is illustrated in the following table:

| Gas | Mol Percent | Refractive Index | B. t. u./Cu. Ft. (77° F., 760 mm.) |
|---|---|---|---|
| Methane | 91.6 | 1.000449 | 978 |
| Ethane | 5.7 | 1.000775 | 1727 |
| Propane | 1.5 | 1.001120 | 2477 |
| Normal Butane | 0.1 | 1.001472 | 3267 |
| Nitrogen | 1.1 | 1.000298 | |

Thus the only component normally present in the residue gas stream which is not a normally gaseous paraffin is nitrogen. However, it has been found that the percentage of nitrogen in such a gas stream normally remains substantially constant and as such the measured refractive index can be calibrated to give a true B. t. u. value that is compensated for the small constant amount of nitrogen present.

A suitable differential refractometer which can be employed in the present invention is illustrated in schematic form in Figure 4. The refractometer comprises a source of light 60 mounted in a housing 61. Source 60 can be an ordinary incandescent bulb emitting radiation in the visible spectrum. Light emitted from source 60 passes through a first aperture 62 and thence through a converging lens 63. A narrow beam of light emerges from housing 61 through a second aperture 64 and is directed through a refractometer cell arrangement 65. The purpose of aperture 62 is to reduce the total transmitted radiation from source 60 to avoid excessive heating of the cell arrangement. The filament of source 60 is near the focal point of lens 63, but slightly therebeyond; and aperture 64 is disposed in close proximity to lens 63. Cell 65 includes a first chamber 66 supplied with an inlet conduit 52 and an outlet conduit 53 through which a sample of the residue gas is circulated from line 13. Cell 65 also includes a second chamber 67 provided with an inlet conduit 68 and an outlet conduit 69 which are adapted for filling chamber 67 with a standard fluid having a refractive index approximating the refractive index of the residue gas sample circulated through chamber 66. Chambers 66 and 67 are separated by a diagonal transverse plate 70 constructed of a material such as glass which is transparent to the light beam from source 60. A converging lens 71 defines one opening of chamber 67; a second converging lens 72 defines a corresponding opening of chamber 66. The components thus far described are arranged such that the aperture 64 is at the effective principal focus of lens 71. In this manner a narrow beam of parallel light enters chamber 67 and emerges from chamber 66 through lens 72 after passing through diagonal plate 70.

The light beam emerging from lens 72 enters a glass prism 74 disposed such that its front surface is perpendicular to the path of light. The light beam is twice reflected in prism 72 and emerges therefrom to pass through a rotatable block of glass 75 having its two surfaces substantially perpendicular to the path of radiation. From glass block 75 the light beam passes through a second prism 76 disposed such that the light beam normally strikes the apex in a line perpendicular to its base. A radiation detector unit comprising first and second photovoltaic cells 78 and 79 is positioned such that the light beam striking the apex of prism 76 normally impinges equally upon adjacent positioned cells 78 and 79. The outputs of cells 78 and 79 are connected in opposition by means of electrical leads 80 and 81 so as to produce a resulting voltage proportional to the difference in total radiation incident upon the two cells. The voltage appearing between leads 80 and 81 is amplified by an amplifier 83, the output of which is applied to a reversible motor 84. The shaft of motor 84 carries a gear 87 which engages a second gear 88. Gear 88 carries a pointer 89 mounted to indicate the degree of rotation of motor 84 produced by the output electrical signal from amplifier 83. Glass block 75 is mounted centrally on a rotatable base 91 having a pivot point at the center thereof. Base 91 is provided with an arm 92 which is attached to a cable 93. Cable 93 passes about suitable support posts 94, 95 and 96 and is wrapped about the shaft 98 attached to gear 88. Thus, rotation of gear 88 in response to the output signal from amplifier 83 moves cable 93 such as to rotate glass block 75 about its mid point. The shaft of motor 84 is also mechanically coupled to a controller 85. Controller 85 can be a conventional instrument such as the Brown Air-O-Line potentiometer air operated recorder-controller which provides a regulated output air pressure representative of the input rotation applied thereto. This regulated air pressure actuates motor valve 37.

If the refractive indices of the gases contained in chambers 66 and 67 are equal the light beam emerging from cell 65 is in optical alignment with the light beam entering said cell 65. The apparatus is initially positioned such that an undeviated light beam strikes the apex of prism 76 and is directed in equal intensities upon cells 78 and 79. However, should the refractive indices of the two gases differ from one another the emerging light beam is deviated in one direction or the other by cell 65 such that a greater intensity of radiation is incident upon either cell 79 or cell 78. This in turn causes an unbalanced voltage, which after amplification, drives motor 84. The rotation of motor 84 in turn drives shaft 98 to rotate glass block 75 through the connecting linkage cable 93. This rotation of block 75 is such as to deviate the light beam in the opposite direction and continues as long as unequal intensities of radiation are incident upon cells 78 and 79. The degree of this rotation, as indicated by pointer 89, is the measure of the difference in refractive indices between the two gases in cell 65, and this rotation also adjusts the output air pressure from controller 85. As illustrated in Figure 1 this output air pressure from controller 85 opens or closes motor valve 37 as previously described.

The operation of the control system of this invention is based upon the concept that the composition of the residue gas stream, and hence the heat content of the stream, is proportional to the refractive index of the residue gas stream as determined by the differential refractometer. It further is known that the absorption temperature influences the composition of the residue gas stream in that lower temperatures favors increased absorption of the hydrocarbons. That is, lower temperatures result in more nearly complete absorption of all components in the oil. Because the absorption of butanes and heavier hydrocarbons is nearly 100 percent under normal operating conditions, any overall increase in absorption results in a slight increase in the absorption of methane, a moderate increase in the absorption of ethane, and greatly increased absorption of propane. The ratio of increased absorption is progressive with increased molecular weight. Thus, by adjusting the temperature of the lean oil supplied to absorber 10 it is possible to control the heat content of the residue gas. A modified control system operating upon this principle is illustrated in Figure 2 wherein components corresponding to like components in Figure 1 are designated by like reference numerals. Cooler 25 is illustrated schematically as including conduits 100 and 101 through which a cooling medium is circulated in heat exchange with the absorbing medium passing through line 12. A line 103 containing a motor driven valve 104 is connected with line 12 to by-pass cooler 25. Valve 104 is in turn controlled by the output air pressure from differential refractometer 51. The operation of this system should readily be apparent. For example, if the heating value of residue gas in line 13 should decrease, the output signal from differential refractometer 51 is such as to open valve 104 to increase the amount of oil by-passing cooler 25, with the result that the temperature of the oil entering absorber 10 is increased. This results in less absorption of the hydrocarbons, which in turn increases the heat value of the overhead residue gas stream to the desired value. Conversely, should the heat value of the residue gas stream tend to increase, the output signal from differential refractometer 51 is such as to close valve 104 thereby resulting in cooler absorbing oil being passed into absorber 10. It should readily be apparent to those skilled in the art that the control of the temperature of absorber 10 can be accomplished in various manners other than as illustrated. For example, by-pass line 103 can be eliminated and motor valve 104 positioned directly in conduit 100 to regulate the rate of cooling medium circulated through cooler 25. A second alternative is to control the temperature of the absorber column by means of an intercooler positioned therein, with the flow of cooling medium being regulated directly by differential refractometer 51. The rate of flow of lean oil passed into absorber 10 can likewise be controlled directly by a motor valve positioned in line 12.

Still another method of control in accordance with this invention is illustrated in Figure 3 wherein a motor valve 110 positioned in residue gas line 13 is adjusted by the output signal from differential refractometer 51. In this embodiment cooler 25 is provided with a by-pass line 103 having a valve 109 therein. This modification is based upon the principle that increased pressure has substantially the same effect as lower temperature on the absorption of hydrocarbons in absorber 10. Thus, if the measured heat content of the gas in line 13 decreases, refractometer 51 functions to open valve 110 to decrease the pressure in absorber 10; and, conversely, if the measured heat content of the gas in line 13 increases, refractometer 51 functions to close valve 110 to increase the pressure in absorber 10.

From the foregoing description it should be apparent to those skilled in the art that the control system herein described is capable of variation in many details without departure from the scope of this invention; and, accordingly, it is not intended that this invention be limted to the precise embodiments illustrated herein. Various auxillary apparatus such as valves and pumps, and detailed construction of the conventional pressure and rate-of-flow regulators has not been shown for purposes of simplicity because the construction and operation of such apparatus is well known. The pressures and temperatures of the absorbing column 10 the stripper column 16 and the de-ethanizer column 24 can be selected as to obtain the desired results and these may be varied within rather wide limits as will readily be realized by those skilled in the art.

While the above-described differential refractometer is particularly adapted for use in the control system of this invention, successful operation of this control system is by no means limited to any particular refractometer. Any of several refractometers well known to those skilled in the art can be employed in like manner. The essence of this invention is the provision of a control system to maintain the heat value of a gas stream constant through a measurement of the refractive index of the gas stream which in turn is indicative of the heat content of said stream.

What is claimed is:

1. A process for separating from a stream of natural gas comprising a mixture of normally gaseous paraffins a gaseous product stream consisting essentially of a mixture of at least three normally gaseous paraffins and containing a larger proportion of paraffins of low molecular weight than said natural gas stream, which comprises passing a feed stream of such natural gas to a separating means and separating from said natural gas feed stream such a gaseous product stream, measuring the refractive index of said product stream, and controlling the operation of said separating means with respect to the proportion of paraffins of higher molecular weight in said product stream to maintain said measured refractive index constant, whereby the heating value of said product stream is maintained constant.

2. A process for separating from a stream of natural gas comprising a mixture of normally gaseous paraffins a gaseous product stream comprising a mixture of normally gaseous paraffins and containing a larger proportion of paraffins of low molecular weight than said natural gas stream, which comprises passing a feed stream of such natural gas to an absorber unit, passing into said absorber unit a stream of material capable of selectively absorbing the paraffins of higher molecular weight present in said natural gas feed stream, withdrawing from said absorber unit such a gaseous product stream, measuring the refractive index of said product stream, and controlling the operation of said absorber unit with respect to the proportion of paraffins of higher molecular weight in said product stream to maintain said measured refractive index constant, whereby the heating value of said product stream is maintained constant.

3. A process for separating from a stream of natural gas comprising a mixture of normally gaseous paraffins a gaseous product stream comprising a mixture of normally gaseous paraffins and containing a larger proportion of paraffins of low molecular weight than said natural gas stream, which comprises passing a feed stream of such natural gas to an absorber unit, passing into said absorber unit a stream of material capable of selectively absorbing the paraffins of higher molecular weight present in said natural gas feed stream, withdrawing from said absorber unit such a gaseous product stream, measuring the refractive index of said product stream, and adjusting the pressure in said absorber unit to maintain said measured refractive index constant, whereby the heating value of said product stream is maintained constant.

4. A process for separating from a stream of natural gas comprising a mixture of normally gaseous paraffins a gaseous product stream comprising a mixture of normally gaseous paraffins and containing a larger proportion of paraffins of low molecular weight than said natural gas stream, which comprises passing a feed stream of such natural gas to an absorber unit, passing into said absorber unit a stream of material capable of selectively absorbing the paraffins of higher molecular weight present in said natural gas feed stream, withdrawing from said absorber unit such a gaseous product stream, measuring the refractive index of said product stream, and adjusting the temperature in said absorber unit to maintain said measured refractive index constant, whereby the heating value of said product stream is maintained constant.

5. A process for separating from a stream of natural gas comprising a mixture of normally gaseous paraffins a gaseous product stream comprising a mixture of normally gaseous paraffins and containing a larger proportion of paraffins of low molecular weight than said natural gas stream, which comprises passing a feed stream of such natural gas to an absorber unit, passing into said absorber unit a stream of material capable of selectively absorbing the paraffins of higher molecular weight present in said natural gas feed stream, withdrawing from said absorber unit such a gaseous product stream, measuring the refractive index of said product stream, and adjusting the temperature of said material stream to maintain said measured refractive index constant, whereby the heating value of said product stream is maintained constant.

6. A process for separating from a stream of natural gas comprising a mixture of normally gaseous paraffins a gaseous product stream consisting essentially of mixture of at least three normally gaseous paraffins and containing a larger proportion of paraffins of low molecular weight than said natural gas stream, which comprises passing a feed stream of such natural gas to a separating means and separating from said natural gas feed stream such a gaseous product stream, mixing with said gaseous product stream a stream of normally gaseous paraffins of higher heating value per unit volume than said gaseous product stream, measuring the refractive index of the resulting product stream containing the added paraffins, and regulating the addition of said stream of normally gaseous paraffins to said product stream to maintain said measured refractive index constant, whereby the heating value of said resulting product stream is maintained constant.

7. A process for controlling the heating value of the final gaseous product of a natural gas separating system wherein a natural gas feed stream is separated into a first gaseous stream consisting essentially of paraffins, and a liquid stream, comprising feeding such a liquid stream to a separating means, removing a second gaseous stream consisting essentially of paraffins therefrom, mixing a portion of said second gaseous stream with said first stream to form a final composite gaseous stream consisting essentially of a mixture of at least three paraffins, measuring the refractive index of said composite stream, and regulating the addition of said second stream to said first stream to maintain said refractive index constant, whereby the heating value of said product stream is maintained constant.

8. Apparatus for controlling a separation system to provide a gaseous product stream of constant heating value comprising an absorber, means to introduce a hydrocarbon mixture into said absorber, means to introduce an absorbing material into said absorber which selectively absorbs hydrocarbons as a direct function of their molecular weight, means to remove a normally gaseous product stream from said absorber, said gaseous product stream containing a larger proportion of hydrocarbons of low molecular weight than said hydrocarbon mixture, a continuous reading refractometer, means passing a sample of said gaseous product stream continuously through said refractometer, and means responsive to the output signal from said refractometer to control the operation of said absorber to maintain the refractive index of said gaseous product constant so that the heating value of said gaseous product stream is maintained constant.

9. The combination in accordance with claim 8 wherein said last mentioned means comprises means to regulate the temperature of the absorbing material added to said absorber so that the temperature of the absorbing medium is decreased when the measured refractive index is increased and is increased when the measured refractive index is decreased.

10. The combination in accordance with claim 8 wherein said last mentioned means comprises means to regulate the pressure in said absorber so that the pressure in said absorber is increased when the measured refractive index is increased and is decreased when the measured refractive index is decreased.

11. Apparatus for controlling a separation system to provide a gaseous product stream of constant heating value comprising an absorber, means to introduce a hydrocarbon mixture into said absorber, means to introduce an absorbing material into said absorber which selectively absorbs hydrocarbons as a direct function of their molecular weight, means to remove a normally gaseous product stream from said absorber, said gaseous product stream containing a larger proportion of hydrocarbons of low molecular weight than said hydrocarbon mixture, a stripper means to pass the enriched absorbing material to said stripper, cooling means, means to pass the stripped absorbing material from said stripper through said cooling means to said absorber, a continuous reading refractometer, means passing a sample of said gaseous product stream continuously through said refractometer, and means responsive to the output signal from said refractometer to control said cooling means to regulate the temperature of the absorbing material added to said absorber so that the temperature of the absorbing medium is decreased when the measured refractive index is increased and is increased when the measured refractive index is decreased.

12. Apparatus for controlling a separation system to provide a gaseous product stream of constant heating value comprising an absorber, means to introduce a hydrocarbon mixture into said absorber, means to introduce an absorbing material into said absorber which selectively absorbs hydrocarbons as a direct function of their molecular weight, means to remove a normally gaseous product stream from said absorber, said gaseous product stream containing a larger proportion of hydrocarbons of low molecular weight than said hydrocarbon mixture, a stripper, means to pass the enriched absorbing material to said stripper, cooling means, means to pass the stripped absorbing material from said stripper through said cooling means to said absorber, a continuous reading refractometer, means passing a sample of said gaseous product stream continuously through said refractometer, and means responsive to the output signal from said refractometer to control the pressure in said absorber so that the pressure in said absorber is increased when the measured refractive index is increased and is decreased when the measured refractive index is decreased.

References Cited in the file of this patent

UNITED STATES PATENTS

| | | |
|---|---|---|
| 2,374,984 | Evans | May 1, 1945 |
| 2,407,838 | Kliever | Sept. 16, 1946 |
| 2,504,464 | Stanley | April. 18, 1950 |
| 2,516,507 | Deming | July 25, 1950 |
| 2,522,059 | Ray et al. | Sept. 12, 1950 |
| 2,529,030 | Latchum | Nov. 7, 1950 |
| 2,553,469 | Pellettere | May 15, 1951 |
| 2,596,692 | Jordan | May 13, 1952 |
| 2,661,812 | Gilmore | Dec. 8, 1953 |